Patented Jan. 31, 1933

1,895,522

UNITED STATES PATENT OFFICE

ELTON B. PUNNETT, OF BUFFALO, NEW YORK, ASSIGNOR TO NATIONAL ANILINE & CHEMICAL COMPANY, INC., OF NEW YORK, N. Y., A CORPORATION OF NEW YORK

PRODUCTION OF MALEIC ANHYDRIDE

No Drawing.   Application filed August 2, 1928. Serial No. 297,091.

This invention relates to the catalytic oxidation of organic compounds for the production of maleic acid and/or its anhydride, and more particularly to the production of maleic acid and/or its anhydride by the partial oxidation of benzene in the vapor phase mixed with an oxygen-containing gas and in the presence of a catalyst comprising an admixture or combination of oxides of metals of the fifth and sixth groups of the periodic system, particularly vanadium oxide and one or more metallic oxides which contribute to the desired reaction, for example, such as are disclosed in U. S. patent to Craver, No. 1,636,857. It relates especially to improvements in said process, and specifically in the catalyst and carrier employed in connection therewith.

One object of the invention is the employment in said process of a contact mass particularly adapted for the selective oxidation of benzene to maleic acid and/or its anhydride.

A further object of the invention is the employment in said process of a contact mass containing a maleic-acid-producing catalyst and a promoter or activator therefor, enabling a higher yield of maleic acid to be obtained under the same operating conditions than can be obtainable without the promoter or activator.

Another object of the invention is the production of maleic acid and/or its anhydride in good yields and of high quality by a process operating practically continuously over comparatively long periods of time.

Other objects of the invention will be apparent from a consideration of the following disclosure which is given for the purpose of illustrating the invention.

It is well known that various organic compounds can be oxidized to useful products by treatment in the vapor phase with an oxygen-containing gas (for example, air) and in the presence of a catalyst under properly controlled conditions of operation, such as temperature, time of contact, velocity of the gas stream, etc. Thus, the oxidation of methyl alcohol to formaldehyde, of benzene to maleic acid, of naphthalene to phthalic anhydride, and the like, have all been carried out under various conditions of temperature, concentration of gases, time of contact between the gases and the catalyst, and with various catalysts, with and without carriers of various kinds.

The oxidation of benzene in the vapor phase, mixed with air, and in the presence of a catalyst, has been heretofore the subject of considerable investigation. According to U. S. Patent No. 1,318,633, maleic acid can be obtained on passing a mixture of benzene vapor and air over a vanadium oxide catalyst supported on fine pumice maintained at a temperature of about 300° to 500° C. U. S. Patent No. 1,636,857 describes the production of maleic acid by means of various mixed oxide catalysts deposited upon various carriers, among which are mentioned pumice, aluminum, copper, nickel, silver, and gold. In addition, the action of metallic oxides, and particularly of such mixtures as vanadium oxide and molybdenum oxide, deposited upon other carriers or distenders, such as, asbestos, "Filtros", and kieselguhr, has been investigated.

In carrying out the catalytic oxidation of benzene in the vapor phase, it is generally the practice to pass the benzene in the vapor phase mixed with oxygen, air, or other gas mixture containing free oxygen through an enclosed space (such as, a so-called converter tube) filled with the catalyst which is usually deposited upon a carrier. The reaction mixture containing maleic acid and/or its anhydride, water vapor, nitrogen, CO, $CO_2$, and other products of combustion is subjected to condensation, or to absorption in water, and maleic acid is recovered from the water solution which is formed.

Various difficulties are encountered in carrying out the process, depending upon the carrier used and the conditions of operation. If asbestos or other fibrous carrier is used, crumbling and matting occur; so that the tubes cannot be filled evenly with the catalyst. Uneven packing results, and the gas flow through the mass does not uniformly distribute itself, causing unequal reaction throughout the mass, and consequently uneven heat distribution. When pumice is employed as a catalyst carrier, particularly for such catalysts as contain vanadium oxide, the life of the catalyst is comparatively short, and the catalyst deteriorates rapidly, resulting probably from chemical or other action between the pumice and the catalyst. A catalyst deposited on "Filtros" does not adhere well to it, probably owing to its vitreous surface; and the catalyst also rapidly deteriorates, apparently due to the disintegration of the "Filtros". Kieselguhr is undesirable owing to dusting of the catalyst and to lack of rigidity. Aluminum is objectionable as a carrier, not only because of its relatively high cost, but also because of its low melting point and consequent low rigidity under elevated temperature conditions. Under ordinary conditions of operation, there are occasional short periods when the temperature approaches the melting point of aluminum, causing the mass to sinter, and shortening the life of the catalyst. Moreover, if the catalyst is deposited on "grained" aluminum and contained in a reaction tube of relatively small cross-section, the sintering of the mass eventually plugs the tube, necessitating suspension of operations for drilling out of the sintered mass.

It has been found according to this invention, that if the catalyst, for example, a catalytic mixture of vanadium and molybdenum oxides, is deposited or coated on fragments, pellets or chips of a porous, fused aluminum oxide material (for example, a porous "Alundum"), preferably of a quality or grade used for filter-plates or blocks, pipes, and similar chemical apparatus, and particularly one containing grains of fused alumina bonded into a porous mass by a suitable ceramic material, for example, fused aluminum silicate, the difficulties above enumerated in connection with other carriers or distenders are obviated to a very large extent. "Alundum" of such quality possesses a high fusion temperature and high porosity, and retains the catalyst coating over a large surface with a high degree of tenacity without danger of sintering and plugging of the catalyst tubes. As distinguished from asbestos, pumice, "Filtros" and kieselguhr, its high rigidity prevents dusting or crumbling, and packing of the catalyst, especially in the lower portions of the catalyst tube, giving more equal distribution of the gas stream and, therefore, more even heat distribution, which is also aided by its relatively high heat conductivity. Its relative inertness also prevents any appreciable reaction with the catalytic oxide, thereby resulting in a long-lived catalyst, and enabling continuous operation of the oxidation process over comparatively long periods of time.

It has furthermore been found, according to this invention, that if the catalysts mentioned for example, in the above U. S. Patent No. 1,636,857 are coated and supported on chips, pellets, or fragments of a porous "Alundum" carrier, and a small amount of an activator or promoter is added (such as, aluminum, magnesium, manganese, or their oxides, preferably in a finely divided form), the production of maleic acid is considerably increased over that obtained with the oxide mixture alone.

It has, moreover, been discovered that if the reaction mixture obtained in passing benzene, or other suitable substance which produces maleic acid, in the vapor phase mixed with air or other oxygen-containing gas over a catalyst, and containing maleic acid anhydride, maleic acid, water vapor, nitrogen, CO, $CO_2$ and other products of combustion, is passed through or otherwise in contact with a relatively high boiling-point solvent for the maleic anhydride and preferably one in which the solubility of the maleic anhydride decreases with a decrease in temperature, the maleic anhydride is absorbed and can be recovered as the anhydride with high efficiency, even in the presence of the water vapor present in the reaction mixture, as more fully described and claimed in my co-pending application Serial No. 595,431, filed February 26, 1932.

One form of "Alundum" found to be especially adaptable as a catalyst carrier consists of grains or crystals of alumina (such as, fused alumina) bonded by a suitable vitrified clay (such as, an aluminum silicate) into a porous mass which is broken into fragments, lumps, or granules, of which the alumina comprises about 80 per cent by weight of the mass, and the vitrified bond comprises about 20 per cent by weight of the mass.

A catalyst found to be especially useful in connection with the invention comprises a mixture of catalytic oxides, for example, a major proportion of vanadium oxide and a minor proportion of molybdenum oxide, deposited upon an "Alundum" carrier, such as above described, and containing a small amount of an activator or promoter such as, for example, aluminum.

The absorbent to be employed in recovering the maleic anhydride is preferably one which is a relatively good solvent for maleic anhydride, which melts at a low temperature (i. e., is liquid at about 0° C.), which has a high boiling-point (i. e., boils above about 150–200° C., and preferably above 250° C.), which has a relatively low vapor pressure at temperatures below 100° C. (so that its loss due to removal by the gas stream will be comparatively small), which dissolves considerably less maleic anhydride at low temperatures (e. g. 0°–10° C.) than it does at the absorption temperature (about 45°–60° C.), and which is relatively immiscible with water; but absorbents may be used which possess to a greater or less extent, most if not all of the above characteristics. Among the absorbent useful in the process there may be mentioned motor oil, diphenyl oxide, nitrobenzol, nitrotoluenes or mixtures thereof, heavy solvent, halogenated benzene hydrocarbons, high boiling organic esters, such as high-boiling esters of maleic, succinic, and fumaric acids (e. g., ethyl, propyl, amyl, or butyl maleate or fumarate), mixtures of chlorinated benzenes, mixtures of halogenated naphthalenes, and alpha-chlornaphthalene, the last mentioned substance being preferred since it possesses substantially all of the above-mentioned properties to a satisfactory degree.

In carrying out the process according to this invention, the catalyst is preferably prepared in a minutely divided condition, and preferably supported upon an inert carrier. The preparation of the catalyst can be accomplished by starting with solutions containing salts of the metals, the oxides of which metals are desired in the finished catalyst, and which metallic salts leave on ignition only the oxides of the metals, or by employing an aqueous suspension of the oxides or hydroxides of the metals or mixtures thereof. I have found, however, that the best results can be obtained by employing a solution of the complex organic acid compounds of the metals, as described in applications of A. E. Craver, Serial Nos. 337,522 and 337,523, filed February 4, 1929. According to said applications, a salt or other compound of the metal whose oxide is desired in the final product (such as, ammonium metavanadate, ammonium molybdate, vanadium pentoxide, or similar metallic compound) is mixed with an organic acid (such as, oxalic, malic, citric, or similar acid), and heated until the reaction therebetween is completed. A "metallic-organo complex" is thus produced (e. g., ammonium divanadyl oxalate, etc.), and this is dissolved in a suitable solvent, such as concentrated ammonium hydroxide. The solution is then mixed with the carrier, and evaporated to dryness while being stirred. In preparing a catalyst containing a mixture of catalytic oxides according to the present invention, solutions of the individual compounds are prepared as above described, and are then mixed; the mixture is mixed with the carrier, preferable an "Alundum" carrier such as above described, and the whole is slowly evaporated to dryness while being stirred.

The activator or promoter is incorporated into the catalyst in any suitable manner, preferably by mixing the dry activator in finely divided form (for example, aluminum powder) with the carrier before adding the solution thereto.

The catalyst is then ignited by passing a current of air, or air mixed with benzol vapors, over the carrier coated with the above compounds, while slowly raising the temperature until the organic matter has been eliminated. The resulting catalyzer or contact mass is composed of individual lumps or fragments of carrier coated and/or impregnated with an intimate mixture of the catalytic oxides and the promoter or activator.

In carrying out the production of maleic anhydride, a mixture of air and benzene is passed over or through the catalyst contained in a closed vessel or tube, the temperature of the catalyst preferably being maintained within the desired range by means of a cooling bath. The reaction mixture containing maleic anhydride is passed through a cooler where it is preliminarily cooled, and then passed through an absorber containing a relatively high boiling, relatively non-volatile, low-melting solvent for the maleic anhydride (such as, alpha-chlornaphthalene) maintained at a temperature of approximately 45° to 60° C. The maleic anhydride is absorbed by the solvent, and the unabsorbed portion of the reaction mixture is then passed to a water scrubber where the residual products are condensed and absorbed.

The maleic anhydride can be recovered from the solvent by cooling the solution to as low a temperature as practicable, permitting it to crystallize, and separating the crystals of maleic anhydride by filtration, centrifuging, or the like.

Pure maleic anhydride may be recovered from the crystals, which contain adhering solvent and other impurities, by dissolving the molten crystals in a suitable solvent (such as solvent naphtha), and slowly cooling the solution to about room temperature. The crystallized mass is filtered and washed with solvent naphtha, yielding a maleic acid anhydride of about 97 to 99½ per cent purity.

The invention will be described in connection with the following example which is given for illustrative purposes only, it not being intended to limit the procedure to the details given, since the process can be varied throughout wide limits without departing from the spirit or scope of the invention. The parts are by weight.

*Example*

*Part 1: Preparation of catalyst.*—45 parts of purified ammonium metavanadate (equivalent to 35 parts of vanadium pentoxide), 141 parts of distilled water and 36 parts of malic acid are heated on a steam bath with occasional stirring until substantially all is in solution. 58 parts of concentrated ammonium hydroxide solution are then added in order to insure alkalinity. In the meantime 16 parts of ammonium molybdate, (equivalent to 13 parts of molybdenum oxide), 9½ parts of malic acid, and 52 parts of distilled water are heated until substantially all is in solution. Sufficient concentrated ammonium hydroxide solution is added to insure alkalinity, the solutions are then mixed, and the mixed solution is boiled for a short time. It is then poured onto a mixture of about 300 grams of porous "Alundum" fragments, of a size that will be passed by a 4 and retained by an 8 mesh screen, mixed with about 3½ parts of aluminum powder (No. 1 fine aluminum bronze). The "Alundum" fragments can be obtained by breaking and screening pieces of grade RA 98 "Alundum" molded material of the Norton Co. of Worcester, Mass. This is a highly porous aluminum oxide material used for filter-blocks, pipes, etc., and contains about 80 per cent of aluminum oxide and about 20 per cent of aluminum silicate, the aluminum oxide being in the form of minute, fused crystals or grains bonded into a porous mass by the vitrified aluminum silicate, and the aluminum silicate having a composition corresponding to about equal weights of alumina and silica. The mixture is slowly evaporated to dryness with constant stirring. The catalyst is then ignited in order to form the catalytic oxides. This is preferably done in the converter, to save unnecessary handling and equipment; but it may be done in any other suitable apparatus, and the finished catalyst may be charged into the converter. In carrying out the ignition in accordance with the preferred method, the fragments of "Alundum", coated and impregnated with the dried organic complexes and the activator, are charged into a catalyst converter tube immersed in a liquid temperature controlling bath, and the compounds are ignited by slowly raising the temperature of the mass while passing through the mass a stream of air, preferably containing benzol vapors, or by any other method well known to the art. When the temperature reaches a point in the neighborhood, for example, of about 475° C., it is maintained approximately at that point until the ignition is complete. The catalyst thus obtained contains a mixture of vanadium and molybdenum oxides together with a small amount of an aluminic activator.

*Part 2: Preparation of maleic acid anhydride.*—Benzene (benzol) is vaporized, the vapors are mixed with about 25 times their weight of air, and the mixture is passed through the converter tube containing the porous contact mass consisting of a mixed oxide catalyst deposited upon and in intimate contact with a porous "Alundum" carrier, prepared as described in Part 1, the temperature of the catalyst being about 500° to 520° C., the pressure being sufficient to force the mixture through the apparatus under approximately atmospheric pressure, and the time of contact between the vapor mixture and the catalyst being about 0.2 seconds (calculated on the basis of the volume of vapor mixture passing through the tube per unit of time under the existing conditions of temperature and pressure).

The maleic acid produced may be recovered in any desired manner. Thus, it may be recovered in the form of acid by condensing the vapors contained in the reaction mixture, or by absorbing them in water; or it may be obtained in the form of maleic anhydride in the following manner.

*Part 3: Recovery of maleic acid anhydride.*—The gas stream leaving the converter and containing the reaction mixture resulting from the reaction described in Part 2 is preferably cooled to a temperature of about 110° to 150° C., and then bubbled through an absorption vessel containing baffles, bubbler plates, or similar devices for assuring an intimate contact between the gas and liquid, and which is partly filled with alpha-chlornaphthalene maintained by suitable cooling means at a temperature of about 45° C. When the alpha-chlornaphthalene becomes saturated with maleic anhydride, it is withdrawn from the absorber and cooled, preferably to a temperature of about 3° C. A mass of small, fine yellowish-white, needle-like crystals of maleic anhydride settles out, and the crystals are separated from the mother liquor; as for example, by filtration or whizzing. The maleic anhydride crystals are then purified by mixing them with about twice their weight of solvent naphtha and heating to a temperature of about 70° C., whereupon the maleic anhydride crystals melt and go into solution in the solvent naphtha. The solution is filtered and then slowly cooled to about room temperature, preferably with gentle agitation, to effect crystallization. The resulting crystals of maleic anhydride are washed with a small amount of solvent naphtha and dried. The alpha-chlornaphthalene mother-liquor resulting from the crystallization step is returned to the absorber for reutilization in the process. The alpha-chlornaphthalene mother-liquor can be repeatedly used in the absorption process, the amount lost being replaced by addition of alpha-chlornaphthalene, since the surprising observation has been made that there is a limited accumulation of impurities in the absorption liquid above which there is no substantial increased accumulation. The solvent naphtha mother-liquor remaining from the purification step can be reused in carrying out further purification until the accumulation of alpha-chlornaphthalene therein becomes excessive, after which it can be subjected to distillation to separate and recover the solvent naphtha from the residual alpha-chlornaphthalene containing maleic anhydride and impurities. The recovered solvent naphtha can be reused in carrying out subsequent purifications, and the residual alpha-chlornaphthalene can be added to the absorbing liquor and reused. It will thus be evident that substantially all of the maleic anhydride produced is recovered, with the exception of that passing out of the absorber in the gas stream. The gas stream leaving the absorber and containing unabsorbed maleic anhydride, maleic acid, and other products of combustion, is passed through an absorber or absorbers containing water from which absorbed material is also recovered.

It is to be understood that the invention is not limited to the above example, and that the various proportions and conditions cited are all capable of wide variation. Intead of the "Alundum" carrier above described, other relatively inert, porous, relatively infusible, rigid materials may be used which tenaciously retain the coating and do not cause appreciable deterioration of the catalyst; and the fragments or pieces may be of a size varying from about 2 to 20 mesh, although 4 to 8 mesh is preferred. Various of the mixed oxide catalysts disclosed in U. S. Patent No. 1,636,857 may be employed, but a catalyst containing a major proportion of vanadium oxide and a minor proportion of molybdenum oxide is preferred, the relative amounts varying from 80 to 60 per cent by weight of vanadium oxide and from 20 to 40 per cent by weight of molybdenum oxide, preferably 75 to 70 per cent of vanadium oxide, and 25 to 30 per cent of molybdenum oxide. The ratio of carrier to catalyst may vary from about 3 to 15 parts by weight of the "Alundum" to one part by weight of the catalytic mixture; and the amount of activator or promoter may vary from about 2 to 20 per cent, preferably 5 to 10 per cent by weight, of the weight of the catalytic oxide mixture. The activator may be added in the form of the oxide or other compound which gives the metal or oxide in active form under the conditions of the reaction, but the incorporation in the catalytic mixture of the metal in finely divided form is preferred.

The incorporation of the activator into the catalyst may be attained in various ways, but the addition of the activator in the form of a finely divided metallic powder to the carrier, prior to the mixing thereof with the catalyst solution and evaporation, is preferred. Where in the claims an expression such as "an aluminic activator" is used, it is intended to include not only metallic aluminum, but also active aluminum oxide and compounds thereof which readily decompose to give aluminum or the active oxide under the conditions of the reaction.

It will furthermore be understood that the inclusion of the activator or promoter is not limited to a catalyst for the production of maleic acid, but catalysts for other oxidation reactions may be activated by the inclusion therewith of an activator; e. g. the vanadium oxide used in the catalytic oxidation of naphthalene to phthalic anhydride, as described and broadly claimed in my copending application Ser. No. 297,089 filed of even date herewith, for catalytic oxidation of organic substances.

The ratio of benzene to air employed can be varied within wide limits; for example, ratios of about 4 to 50, preferably 25 to 30, parts by weight of air to one part by weight of benzol may be employed; and instead of air, oxygen, ozone, or other oxygen-containing gas mixtures may be used. The reaction temperature can also be varied from about 375° to 550° C., temperatures of 475° to 525° C. being preferred; and the time of contact can be from about 0.10 to 2.0 seconds, 0.15 to 0.25 seconds being preferred. The temperature, pressure, and time of contact are all interrelated, a higher temperature usually being employed with a higher rate of speed of the gas stream. These latter conditions are also dependent upon the activity of the catalyst, the temperature usually being higher with a less active catalyst; that is, one containing the higher percentage of molybdenum oxide, or the smaller quantity of activator.

Pressures at, above, and below atmospheric may be used in carrying out the oxidation, increase in pressure increasing the production of maleic acid per unit of apparatus without deleteriously affecting the quality of product within limits. A superatmospheric pressure of about 2 to 30 or 40 pounds, and preferably 15 to 20 pounds, per square inch, however, has been found to be especially desirable.

Various types of apparatus may be used for carrying out the process; for example, the catalyst may be placed in tubes, or upon shelves or trays, as shown, for example, in U. S. Patent No. 1,515,299. A form of apparatus found to be especially adapted to the process, however, is one in which the catalyst is contained in vertical tubes immersed in a liquid temperature regulating bath, such as are shown, for example, in U. S. Patents Nos. 1,374,720 and 1,604,739; but it is to be understood that the invention is not restricted to any particular form of apparatus.

I claim:

1. In the production of maleic anhydride by the catalytic partial oxidation of benzene in the vapor phase and in the presence of a catalyst, the improvement which comprises passing a mixture of benzene vapor and a gas containing free oxygen in contact with a catalyst comprising a mixture containing vanadium oxide and an activator deposited upon and in intimate contact with a relatively inert, porous carrier containing fused aluminum oxide.

2. In the production of maleic anhydrde by the catalytic partial oxidation of benzene in the vapor phase and in the presence of a catalyst, the improvement which comprises passing a mixture of benzene vapor and a gas containing free oxygen in contact with a catalyst containing vanadium oxide in admixture with an aluminic activator, said catalyst being deposited upon and in intimate contact with a porous "Alundum" as a carrier.

3. In the production of maleic anhydride by the catalytic partial oxidation of benzene in the vapor phase and in the presence of a catalyst, the improvement which comprises passing a mixture of benzene vapor and a gas containing free oxygen in contact with a mixture containing a relatively large proportion of a mixture of oxides of metals selected from the fifth and sixth groups of the periodic system, and a relatively small proportion of an activator, as a catalyst, deposited upon and in intimate contact with a relatively infusible, porous carrier which is substantially inert to the catalyst.

4. In the production of maleic anhydride by the catalytic partial oxidation of benzene in the vapor phase and in the presence of a catalyst, the improvement which comprises passing a mixture of benzene vapor and a gas containing free oxygen in contact with a catalyst comprising vanadium oxide and an activator therefor selected from the group consisting of aluminum, magnesium, manganese and their oxides, said activator being in finely divided condition and intimately mixed with said vanadium oxide.

5. In the production of maleic anhydride by the catalytic partial oxidation of benzene in the vapor phase and in the presence of a catalyst, the improvement which comprises passing a mixture of benzene vapor and a gas containing free oxygen in contact with a catalyst comprising a relatively large proportion of a mixture containing vanadium oxide and an oxide of another metal selected from the fifth and sixth groups of the periodic system, and a relatively small proportion of an activator therefor selected from the group consisting of aluminum, magnesium, manganese and their oxides, said activator being in finely divided condition and intimately mixed with said mixture of oxides.

6. In the production of maleic anhydride by the catalytic partial oxidation of benzene in the vapor phase and in the presence of a catalyst, the improvement which comprises passing a mixture of benzene vapor and a gas containing free oxygen in contact with a mixture initially containing a relatively large proportion of a mixture of oxides of metals selected from the fifth and sixth groups of the periodic system, and a relatively small proportion of an activator therefor selected from the group consisting of aluminum, magnesium and manganese, as a catalyst, said activator being in finely divided condition and intimately mixed with said mixture of oxides.

7. In the production of maleic anhydride by the catalytic partial oxidation of benzene in the vapor phase and in the presence of a catalyst, the improvement which comprises passing a mixture of benzene vapor and a gas containing free oxygen in contact with a catalyst comprising vanadium oxide and an activator therefor selected from the group consisting of aluminum, magnesium, manganese and their oxides, deposited upon and in intimate contact with a relatively infusible, porous carrier which is substantially inert to the catalyst and contains fused aluminum oxide.

8. In the production of maleic anhydride by the catalytic partial oxidation of benzene in the vapor phase and in the presence of a catalyst, the improvement which comprises passing a mixture of benzene vapor and a gas containing free oxygen in contact with a catalyst comprising a relatively large proportion of a mixture containing vanadium oxide and an oxide of another metal selected from the fifth and sixth groups of the periodic system, and a relatively small proportion of an activator therefor selected from the group consisting of aluminum, magnesium and manganese, deposited upon and in intimate contact with a relatively infusible, porous carrier which is substantially inert to the catalyst and contains fused aluminum oxide.

9. In the production of maleic anhydride by the catalytic partial oxidation of benzene in the vapor phase and in the presence of a catalyst, the improvement which comprises passing a mixture of benzene vapor and air in contact with a mixture initially containing a relatively large proportion of mixed vanadium and molybdenum oxides and a relatively small proportion of aluminum in finely divided condition, as a catalyst, maintained at a temperature of about 475° to 550° C.

10. In the production of maleic anhydride by the catalytic partial oxidation of benzene in the vapor phase and in the presence of a catalyst, the improvement which comprises passing a mixture of benzene vapor and a gas containing free oxygen in contact with a mixture initially containing about 80 to 60 parts by weight of vanadium oxide, about 20 to 40 parts by weight of molybdenum oxide, and about 5 to 10 parts by weight of aluminum powder, as a catalyst, maintained at a temperature of about 475° to 550° C.

11. In the production of maleic anhydride by the catalytic partial oxidation of benzene in the vapor phase and in the presence of a catalyst, the improvement which comprises passing a mixture of benzene vapor and air in contact with a contact mass consisting of a mixture containing from about 80 to 60 parts by weight of vanadium oxide, from about 20 to 40 parts by weight of molybdenum oxide, and from about 5 to 10 parts by weight of an activator selected from the group consisting of aluminum, magnesium and manganese, deposited upon and in intimate contact with fragments of a porous "Alundum".

12. In the production of maleic anhydride by the catalytic partial oxidation of benzene in the vapor phase and in the presence of a catalyst, the improvement which comprises passing a mixture of benzene vapor and air in contact with a mixture initially containing from about 80 to 60 parts by weight of vanadium oxide, from about 20 to 40 parts by weight of molybdenum oxide, and from about 5 to 10 parts by weight of an aluminic activator, as a catalyst, deposited upon and in contact with a porous "Alundum" which contains fused aluminum oxide and aluminum silicate in its composition, as a carrier.

13. In the production of maleic anhydride by the catalytic partial oxidation of benzene in the vapor phase and in the presence of a catalyst, the improvement which comprises passing a mixture of benzene vapor and air in contact with a contact mass consisting of a mixture initially containing from about 80 to 60 parts by weight of vanadium oxide, from 20 to 40 parts by weight of molybdenum oxide, and from about 5 to 10 parts by weight of aluminum powder, deposited upon and in contact with a porous "Alundum" which includes fused aluminum oxide and aluminum silicate in its composition, as a carrier, maintained at a temperature of about 475° to 550° C., the time of contact between the gas mixture and catalyst being about 0.1 to 0.25 seconds.

14. In the production of maleic anhydride by the catalytic oxidation of benzene in the vapor phase and in the presence of a catalyst, the improvements which comprise passing a mixture containing one part by weight of benzene and about 25 parts by weight of air in contact with a porous contact mass consisting of a mixture initially containing approximately 70 parts by weight of vanadium oxide, 30 parts by weight of molybdenum oxide, and 7 parts by weight of finely divided aluminum, deposited upon and in intimate contact with a porous "Alundum" containing about 80 per cent of alumina and about 20 per cent of aluminum silicate, at a superatmospheric pressure of approximately 15 to 20 pounds per square inch.

15. In the production of maleic anhydride by the catalytic partial oxidation of benzene in the vapor phase and in the presence of a catalyst, the improvement which comprises oxidizing benzene in the vapor phase in contact with a porous contact mass comprising a relatively infusible, rigid, porous carrier substantially inert to the catalyst impregnated and coated with a mixture of about 80 to 60 parts by weight of vanadium oxide and from about 20 to 40 parts by weight of molybdenum oxide per 100 parts of mixture.

16. In the production of maleic anhydride by the catalytic partial oxidation of benzene in the vapor phase and in the presence of a catalyst, the improvement which comprises oxidizing benzene in the vapor phase in contact with a porous contact mass comprising a porous carrier which is relatively infusible, is rigid, and contains fused aluminum oxide, impregnated and coated with a mixture of about 80 to 60 parts by weight of vanadium oxide and from about 20 to 40 parts by weight of molybdenum oxide per 100 parts of mixture.

17. In the production of maleic anhydride by the catalytic partial oxidation of benzene in the vapor phase and in the presence of a catalyst, the improvement which comprises oxidizing benzene in the vapor phase in contact with a porous contact mass comprising a porous "Alundum" carrier impregnated and coated with a mixture of about 80 to 60 parts by weight of vanadium oxide and from about 20 to 40 parts by weight of molybdenum oxide per 100 parts of mixture.

18. In the production of maleic anhydride by the catalytic partial oxidation of benzene in the vapor phase and in the presence of a catalyst, the improvement which comprises oxidizing benzene in the vapor phase in contact with a porous contact mass comprising fragments of a porous "Alundum" carrier, 2 to 20 mesh in size, impregnated and coated with a mixture of about 80 to 60 parts by weight of vanadium oxide and from about 20 to 40 parts by weight of molybdenum oxide per 100 parts of mixture.

19. In the production of maleic anhydride by the catalytic partial oxidation of benzene in the vapor phase and in the presence of a catalyst, the improvement which comprises oxidizing benzene in the vapor phase in contact with a porous contact mass comprising fragments of a porous "Alundum" carrier, 4 to 8 mesh in size and containing about 80 per cent. of alumina and about 20 per cent. of aluminum silicate, impregnated and coated with a mixture containing approximately 70 parts by weight of vanadium oxide and approximately 30 parts by weight of molybdenum oxide.

In testimony whereof I affix my signature.
ELTON B. PUNNETT.